(12) United States Patent
Takimoto et al.

(10) Patent No.: US 7,045,990 B2
(45) Date of Patent: May 16, 2006

(54) PORTABLE DEVICE HAVING A CHARGING CIRCUIT AND SEMICONDUCTOR DEVICE FOR USE IN THE CHARGING CIRCUIT OF THE SAME

(75) Inventors: Kyuichi Takimoto, Kasugai (JP); Hidekiyo Ozawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 10/665,406

(22) Filed: Sep. 22, 2003

(65) Prior Publication Data

US 2005/0017676 A1  Jan. 27, 2005

(30) Foreign Application Priority Data

Sep. 18, 2002 (JP) .............................. 2002-270952

(51) Int. Cl.
*H01M 10/44* (2006.01)
(52) U.S. Cl. ..................................................... 320/134
(58) Field of Classification Search ................ 320/134, 320/136, 132, 137, 152, 162
See application file for complete search history.

(56) References Cited

U.S. PATENT DOCUMENTS 3,784,892 A * 1/1974 Zelina .......................... 320/132
5,113,128 A * 5/1992 Ohara et al. ................. 320/160
5,254,930 A * 10/1993 Daly ........................... 320/119

FOREIGN PATENT DOCUMENTS

JP      11-187588      7/1999

* cited by examiner

*Primary Examiner*—Edward H. Tso
(74) *Attorney, Agent, or Firm*—Staas & Halsey LLP (57) ABSTRACT

A portable device for preventing overcharging of a secondary battery resulting from contact failure of a voltage detection terminal. The portable device includes a charging circuit for charging the secondary battery when a battery pack, which includes the secondary battery, is connected to the portable device. The charging circuit includes a charging terminal, which is used to supply the secondary battery with charging current, and a voltage detection terminal, which is used to detect voltage of the secondary battery. The charging circuit stops charging the secondary battery when voltage abnormality is detected at the voltage detection terminal.

16 Claims, 3 Drawing Sheets

PORTABLE DEVICE HAVING A CHARGING CIRCUIT AND SEMICONDUCTOR DEVICE FOR USE IN THE CHARGING CIRCUIT OF THE SAME

CROSS-REFERENCE TO RELATED APPLICATIONS

This application is based upon and claims the benefit of priority from the prior Japanese Patent Application No. 2002-270952, filed on Sep. 18, 2002, the entire contents of which are incorporated herein by reference.

BACKGROUND OF THE INVENTION

The present invention relates to a portable device having a charging circuit for charging a secondary rechargeable battery incorporated in a detachable battery pack and to a semiconductor device configuring the charging circuit.

Portable devices, such as a notebook computer, a personal digital assistant (PDA), and a cellular phone, use battery packs. A battery pack includes a secondary battery. A lithium ion battery is often employed as the secondary battery. The lithium ion battery is advantageous in that it decreases the operation cost of devices using the battery and in that it enables a large amount of current to be instantaneously discharged. A device employing a secondary battery, such as a lithium ion battery, normally incorporates a charging circuit. The charging circuit is connected to an AC adapter, which functions as an external power supply, to charge the secondary battery. However, recent portable devices have more functions and are becoming more compact. As a result, the charging circuit is required to be more compact and must be fully charged more quickly.

When using a lithium ion battery in a portable device, the charging capacity of the battery is greatly affected by the charging voltage. Thus, the charging voltage must be accurately controlled. Accordingly, the battery is charged by a constant voltage and a constant current. The lithium ion battery is sensitive to overcharging and overdischarging. The battery deteriorates when the charging voltage is too high, and overdischarging makes it difficult for the battery to function properly. Accordingly, in addition to the lithium ion battery, a battery pack for a portable device includes a protection circuit, which prevents overcharging and overdischarging of the battery.

When charging a lithium ion battery in a battery pack, a charger controls the charging voltage supplied to the battery pack to be at a desired voltage value. The protection circuit of the battery pack includes a switch circuit for preventing overcharging and overdischarging. Due to the impedance of the switch circuit, the actual voltage applied to a battery cell in the battery pack is lower than the charging voltage that the charger supplies the battery pack with. This results in shortcomings such as insufficient charging and lengthened charging time. To solve such a problem, Japanese Laid-Open Patent Publication 11-187588 (pages 4 and 5, FIG. 1) describes a method for directly detecting the voltage of the battery cell in the battery pack to control charging in accordance with the detected voltage value.

Figure 1:
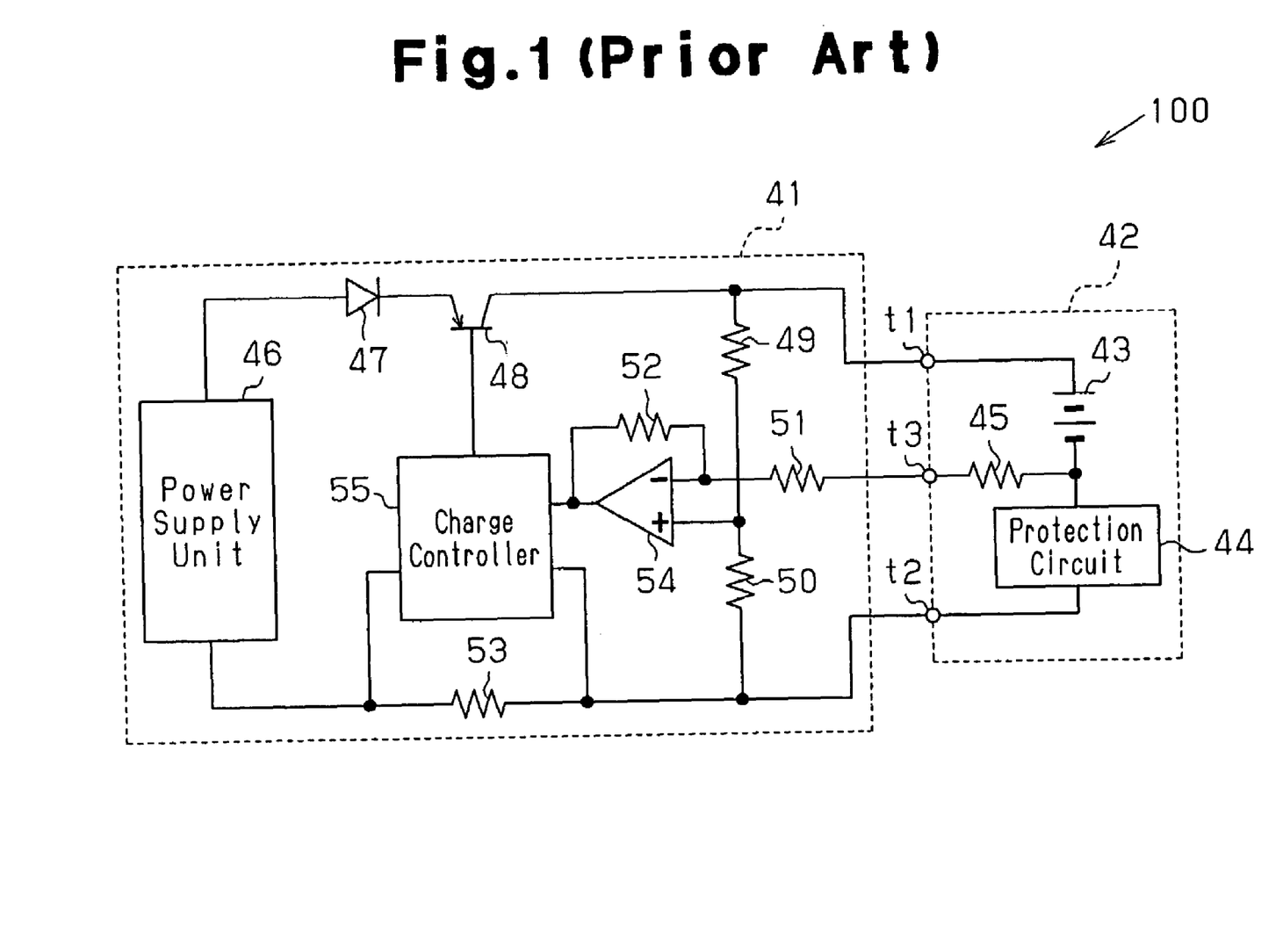
FIG. 1 is a schematic circuit diagram of a prior art charging system.

FIG. 1 is a schematic circuit diagram showing a charging system 100, which is described in the publication. As shown in FIG. 1, a battery pack 42 is connected to a charging circuit 41. The battery pack 42 includes a battery cell 43, a protection circuit 44, a battery protection resistor 45, a positive terminal t1, a negative terminal t2, and a voltage detection terminal t3 of the battery cell 43. The charging circuit 41 includes a power supply unit 46, a reverse flow prevention diode 47, an output control transistor 48, cell voltage detection resistors 49, 50, 51, and 52, a current detection resistor 53, an operational amplifier 54, and a charge controller 55.

In the charging circuit 41, the cell voltage detection resistors 49 and 50 are connected in series between the positive terminal t1 and the negative terminal t2. The resistors 49 and 50 divide the voltage between the positive terminal t1 and the negative terminal t2 of the battery pack 42. A voltage dividing node is connected to a non-inverting input terminal of the operational amplifier 54.

The cell voltage detection resistors 51 and 52 are connected in series between the voltage detection terminal t3 and the output terminal of the operational amplifier 54. A connection node between the resistors 51 and 52 is connected to the inverting input terminal of the operational amplifier 54. The cell voltage detection resistors 49 to 52, the battery protection resistor 45, and the operational amplifier 54 configures a differential amplification circuit. Each resistance of the differential amplification circuit is adjusted to obtain the amplification rate of "1". This supplies cell voltage from the operational amplifier 54 to the charge controller 55.

The charge controller 55 retrieves the potentials at both ends of the current detection resistor 53 and detects the charging current from the voltage drop of the resistor 53. The charge controller 55 controls the output control transistor 48 based on the charging current and the cell voltage, which is supplied from the operational amplifier 54, to charge the battery cell 43 at a constant current and constant voltage. More specifically, the battery cell 43 is charged by a constant current until reaching a predetermined charging voltage. After reaching the predetermined charging voltage, the battery cell 43 is charged by a constant voltage. In this manner, the charging voltage, which is obtained by correcting the voltage drop at the protection circuit 44, is applied to the battery cell 43, and the voltage of the battery cell 43 is increased. As a result, the battery is sufficiently charged and the charging time is reduced.

The battery pack 42 is detachable. Thus, there is always the possibility of contact failure with the charging circuit 41. In the charging system 100, when there is a contact failure at the voltage detection terminal t3, which detects the voltage of the battery cell 43, the cell voltage is not correctly detected. This hinders charging with the constant voltage. In other words, even if the battery cell 43 is charged with the constant current until the charging voltage reaches the predetermined value, charging cannot be switched from the constant current to the constant voltage. Thus, charging is continued with the constant current. This may increase the charging voltage of the battery and overcharge the battery cell 43.

SUMMARY OF THE INVENTION

One aspect of the present invention is a portable device connectable to a battery pack including a secondary battery. The portable device includes a charging circuit for charging the secondary battery when the battery pack is connected to the portable device. The charging circuit includes a charging terminal used to supply the secondary battery with charging current and a voltage detection terminal used to detect voltage of the secondary battery in the battery pack. The charging circuit stops charging of the secondary battery if a voltage abnormality is detected at the voltage detection terminal.

Another aspect of the present invention is a semiconductor device for use in a charging circuit of a portable device connectable to a battery pack including a secondary battery. The charging circuit charges the secondary battery when connected to the portable device supplies the secondary battery with charging current, and includes a voltage detection terminal used to detect voltage of the secondary battery in the battery pack and a current detection resistor for detecting the charging current. The semiconductor device includes a current detection circuit connected to the current detection resistor to generate a current detection signal corresponding to the charging current flowing through the current detection resistor. A first error amplifier is connected to the current detection circuit. The first error amplifier compares the current detection signal with a first reference voltage to obtain the difference therebetween and amplifies the difference to generate a first charge control signal with a voltage that causes charging to be performed at a constant current when the voltage at the voltage detection terminal is normal. A second error amplifier is connected to the voltage detection terminal. The second error amplifier compares voltage derived from the voltage of the secondary battery with a second reference voltage and amplifies the difference to generate a second charge control signal that causes charging to be performed at a constant voltage when the voltage at the voltage detection terminal is normal. The first error amplifier is supplied with the voltage of the voltage detection terminal and generates the first charge control signal with a voltage that causes charging to be stopped when the voltage at the voltage detection terminal is abnormal.

A further aspect of the present invention is a method for charging a secondary battery of a battery pack with a portable device that is connectable to the battery pack. The battery pack includes a first voltage detection terminal used to detect voltage of the secondary battery in the battery pack, and the portable device includes a second voltage detection terminal connected to the first voltage detection terminal. The method includes connecting the battery pack to the portable device and supplying charging current to the battery pack from the portable device, detecting the charging current and generating a current detection signal that is in accordance with the charging current, comparing voltage of the current detection signal with voltage at the second voltage detection terminal, and stopping the supply of charging current to the battery pack from the portable device in accordance with the result of the comparison.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 2:
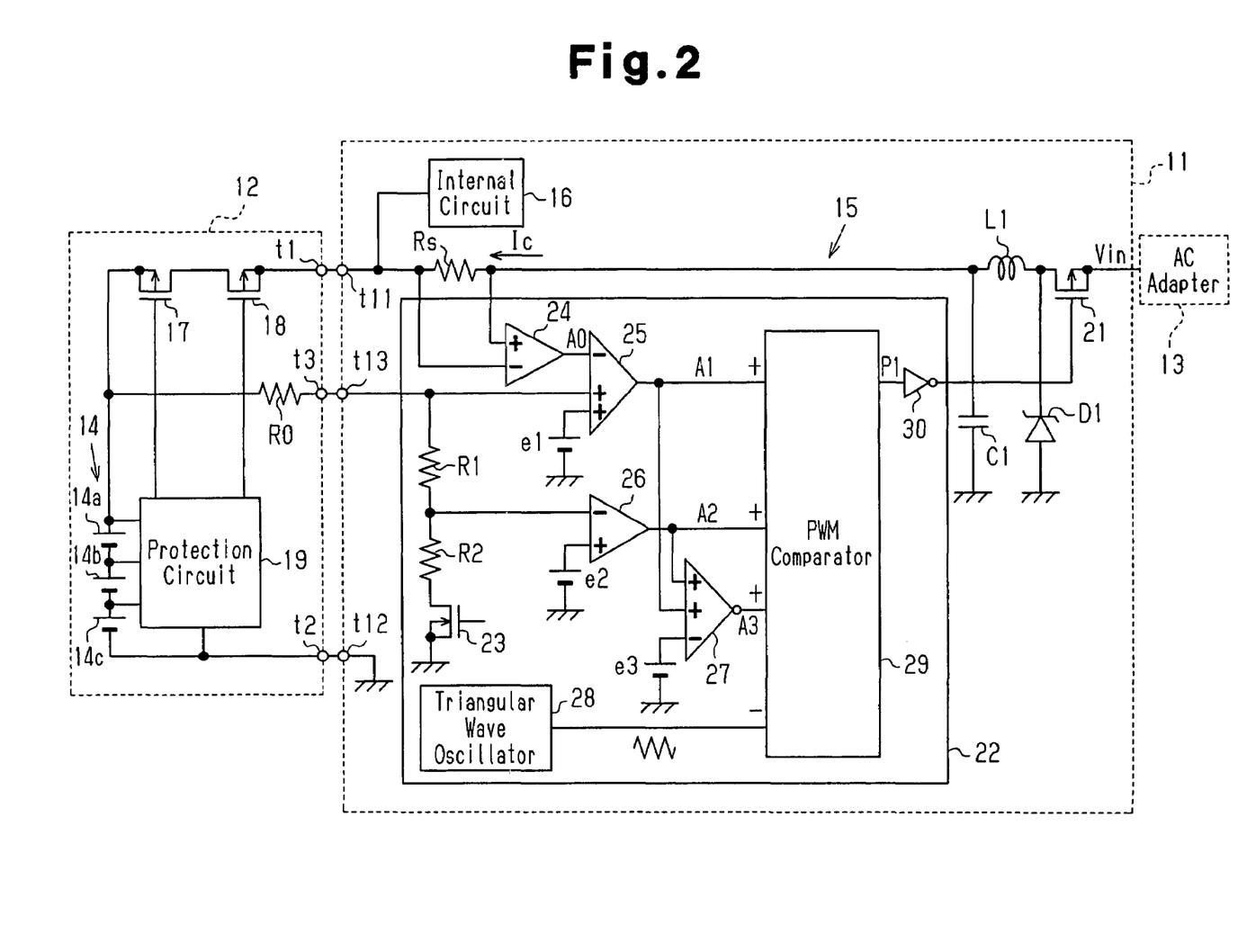
FIG. 2 is a schematic circuit diagram of a portable device according to a preferred embodiment of the present invention.

In the drawings, like numerals are used for like elements throughout. FIG. 2 is a schematic circuit diagram of a portable device (notebook computer) 11 according to a preferred embodiment of the present invention.

A battery pack 12 is connected to the portable device 11. The portable device 11 is connected to an AC adapter 13, which serves as an external power supply. The portable device 11 includes a charging circuit 15 for charging a secondary battery 14, which is incorporated in the battery pack 12, and an internal circuit 16, which is operated by the battery voltage of the secondary battery 14. The internal circuit 16 includes a microcomputer, which centrally controls the portable device 11, and its peripheral circuits.

The battery pack 12 is detachably connected to the portable device 11. When the battery pack 12 is connected to the portable device 11, the charging circuit 15 charges the secondary battery 14. The secondary battery 14 of the battery pack 12 is, for example, a lithium ion battery, and includes a plurality of (three in FIG. 2) battery cells 14a, 14b, and 14c, which are connected in series with one another. In addition to the secondary battery 14, the battery pack 12 includes a discharge control switch 17, a charge control switch 18, and a protection circuit 19.

The positive terminal of the battery cell 14a is connected to a positive terminal t1 of the battery pack 12 via the discharge control switch 17 and the charge control switch 18. The negative terminal of the battery cell 14c is connected to a negative terminal t2 of the battery pack 12. The positive terminal of the battery cell 14a is connected to a voltage detection terminal t3 via a resistor R0. The voltages of the battery cells 14a to 14c (battery voltage of the secondary battery 14) are output from the voltage detection terminal t3.

The positive terminal t1 of the battery pack 12 is connected to a positive terminal t11 of the charging circuit 15. The negative terminal t2 of the battery pack 12 is connected to a negative terminal t12 of the charging circuit. The voltage detection terminal t3 of the battery pack 12 is connected to a voltage detection terminal t13 of the charging circuit 15.

The charge control switch 17 and the discharge control switch 18 are preferably p-channel MOSFETs. The source of the discharge control switch 17 is connected to the positive terminal of the battery cell 14a. The drains of the switches 17 and 18 are connected to each other. The source of the charge control switch 18 is connected to the positive terminal t1 of the battery pack 12. Each of the switches 17 and 18 configures a diode in which its back gate is in the forward direction of the charging current and the discharging current. The gates of the discharge control switch 17 and the discharge control switch 18 are connected to the protection circuit 19. The protection circuit 19 activates and deactivates the switches 17 and 18 with a control signal.

During discharging, the discharge control switch 17 and the charge control switch 18 are turned ON. This supplies the portable device 11 with discharging current via the switches 17 and 18. Further, during charging, the charge control switch 18 and the discharge control switch 17 are turned ON. This supplies the secondary battery 14 with charging current via the switches 18 and 17.

The protection circuit 19 includes an overdischarge prevention circuit and an overcharge prevention circuit (neither shown). The protection circuit 19 detects the inter-terminal voltages (cell voltages) of the battery cells 14a to 14c. When any one of the cell voltages decreases to a predetermined voltage or less (overdischarge state), the protection circuit 19 turns OFF the discharge control switch 17 and prohibits discharging. On the other hand, when any one of the cell voltages increases to a predetermined voltage or greater (overcharge state), the protection circuit 19 turns OFF the charge control switch 18 and prohibits charging.

The charging circuit 15 of the portable device 11 is a switching regulator type DC-DC converter and converts an input voltage Vin, which is supplied from the AC adapter 13, to a constant voltage and constant current that are used to charge the secondary battery 14. The charging circuit 15 includes a sense resistor Rs, which is used to measure charging current Ic, a choke coil L1, a flywheel diode D1, a smoothing capacitor C1, a main switch (p-channel MOSFET) 21, and a charge IC 22. The charging circuit 15 of the preferred embodiment is a remote sense type circuit for directly detecting the voltage at the positive terminal of the secondary battery 14 in the battery pack 12 and charging the secondary battery 14.

The charge IC 22 is configured on a single semiconductor substrate chip. Further, the charge IC 22 includes voltage dividing resistors R1 and R2, which are used to measure voltage, a switch (n-channel MOSFET) 23, a voltage amplifier 24, first and second error amplifiers 25 and 26, a voltage comparator (charging suspension circuit) 27, a triangular wave oscillator 28, a PWM comparator 29, and a buffer 30.

The voltage amplifier 24 has an inverting input terminal connected to a low potential terminal of the sense resistor Rs and a non-inverting input terminal connected to a high potential terminal of the resistor Rs. The voltage amplifier 24 detects a voltage drop in the charging current (output current) Ic flowing through the resistor Rs and amplifies the detected value to generate a current detection signal A0 in accordance with the charging current Ic. The current detection signal A0 is provided to the first error amplifier 25. More specifically, the voltage amplifier 24 raises the level of the current detection signal A0 when the charging current Ic increases and lowers the level of the current detection signal A0 when the charging current Ic decreases.

The first error amplifier 25 includes an inverting input terminal, a first non-inverting input terminal, and a second non-inverting input terminal. The first error amplifier 25 amplifies the difference between the lower one of the two input voltages of the first and second non-inverting input terminals and the input voltage of the inverting input terminal. In the error amplifier 25, the inverting input terminal is provided with the current detection signal A0 from the voltage amplifier 24, the first non-inverting input terminal is supplied with battery voltage via the voltage detection terminal t13, and the second non-inverting input terminal is supplied with a first reference voltage e1.

The first reference voltage e1 is a reference value for setting the charging current Ic. The battery cells 14a to 14c, which are lithium batteries, may be damaged if they are discharged to a predetermined voltage or less (more specifically, 2.0 V or less). Thus, the protection circuit 19 prohibits discharging before reaching the predetermined voltage. As a result, the battery voltage of the secondary battery 14 does not decrease to 6 V or less. Accordingly, when the voltage detection terminal t3 of the battery pack 12 and the voltage detection terminal t13 of the charging circuit 15 are normally connected to each other, the first error amplifier 25 amplifies the voltage difference between the first reference voltage e1 and the current detection signal A0 to generate a first charge control signal A1.

The voltage detection terminal t13 of the charging circuit 15 is connected to the ground via the voltage dividing resistors R1 and R2 and the switch 23. The switch 23 is turned ON during charging and turned OFF when the charging is stopped. By turning OFF the switch 23 when the charging is stopped, the power consumed by the secondary battery 14 is reduced.

When a contact failure occurs at the voltage detection terminal t13 during charging, the potential at the voltage detection terminal t13 decreases to the ground level (0 V), and the ground voltage (0 V) is applied to the first non-inverting input terminal of the first error amplifier 25. In this case, the first error amplifier 25 amplifies the difference between the ground voltage and the current detection signal A0 to generate the first charge control signal A1.

A connection node (voltage dividing node) between the voltage dividing resistors R1 and R2 is connected to the inverting terminal of the second error amplifier 26. A divisional voltage corresponding to the battery voltage from the voltage detection terminal t13 is supplied to the inverting input terminal of the second error amplifier 26. The non-inverting input terminal of the second error amplifier 26 is supplied with a second reference voltage e2. The second error amplifier 26 amplifies the difference between the divisional voltage and a second reference voltage e2 and generates a second charge control signal A2 in accordance with the voltage difference. The second charge control signal A2 is provided to the voltage comparator 27 and the PWM comparator 29.

The voltage comparator 27 includes a first non-inverting input terminal, a second non-inverting input terminal, and an inverting input terminal. The voltage comparator 27 compares the lower one of the input voltages of the first and second non-inverting input terminals with the input voltage of the inverting input terminal to generate a third charge control signal A3 in accordance with the comparison result. In the voltage comparator 27, the first non-inverting input terminal is provided with the second charge control signal A2 of the second error amplifier 26, the second non-inverting input terminal is provided with the first charge control signal A1 of the first error amplifier 25, and the inverting input terminal is supplied with a third reference voltage e3. The voltage comparator 27 generates the third charge control signal A3 at a low level. When any one of the charge control signals A1 and A2 is lower than the third reference voltage e3, the voltage comparator 27 generates the third charge control signal A3 at a high level.

The triangular wave oscillator 28 generates a triangular wave signal having a predetermined cycle and provides the triangular wave signal to the PWM comparator 29. The third reference voltage e3 is substantially the same as the maximum voltage of the triangular wave signal.

The PWM comparator 29 includes first to third non-inverting input terminals and an inverting input terminal. The PWM comparator 29 compares the lowest one of the input voltages applied to the first to third non-inverting input terminals with the input voltage applied to the inverting input terminal and generates a PWM signal P1 having a predetermined duty ratio in accordance with the comparison result. In the PWM comparator 29, the first non-inverting input terminal is provided with the first charge control signal A1, and the second non-inverting input terminal is provided with the second charge control signal A2. Further, the third non-inverting input terminal is provided with the third control charge control signal A3, and the inverting input terminal is provided with the triangular wave signal.

The charging circuit 15 operates in constant current output mode when the battery voltage of the secondary battery 14 is lower than a predetermined voltage and operates in constant voltage output mode when the battery voltage of the secondary battery 14 reaches a predetermined voltage. When the charging circuit 15 operates in the constant current output mode (during current control), the PWM comparator 29 compares the first charge control signal A1 of the first error amplifier 25, which is a constant current control circuit, with the triangular wave and generates the PWM signal P1 in accordance with the comparison result. When the charging circuit 15 operates in the voltage output mode (during voltage control), the PWM comparator 29 compares the second charge control signal A2 of the second error amplifier 26, which is a constant voltage control circuit, with the triangular wave and generates the PWM signal P1 in accordance with the comparison result. The buffer (inverter circuit) 30 inverts the PWM signal P1 and provides the inverted PWM signal P1 to the gate of the main switch 21.

The PWM signal P1 controls the activation and deactivation of the main switch 21 so that the output of the charging circuit 15 is maintained in a normal state. When the main switch 21 is turned ON, the input voltage Vin is provided to an LC circuit, which includes the choke coil L1 and the smoothing capacitor C1, via the main switch 21. When the main switch 21 is turned OFF, the flywheel diode D1 configures a current path and supplies the battery pack 12 with the energy stored in the coil L1 when the main switch 21 was ON. In this state, the smoothing capacitor C1 smoothes the charging voltage supplied to the battery pack 12.

Accordingly, the charging voltage and the charging current supplied to the battery pack 12 from the charging circuit 15 is controlled in accordance with the duty ratio (the ratio between the ON time and OFF time of the main switch 21) of the PWM signal P1.

The charging operation of the charging circuit 15 in the preferred embodiment will now be discussed.

Figure 3:
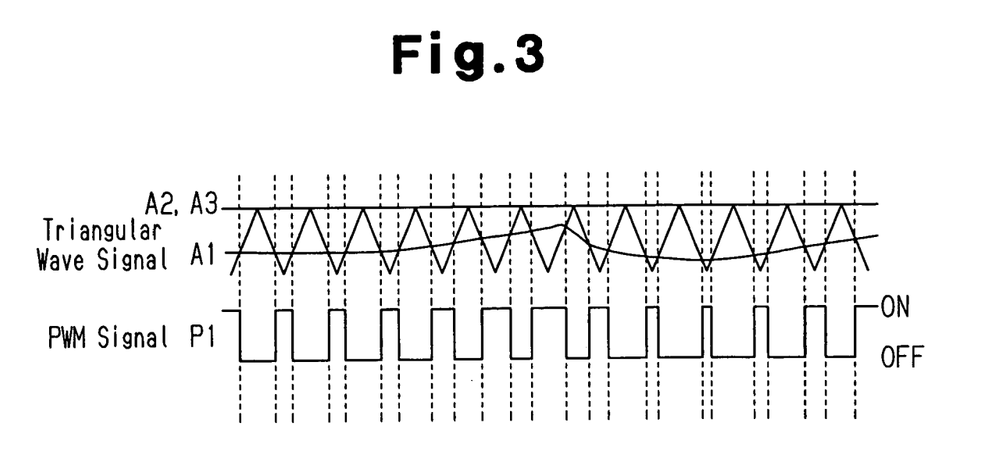
FIG. 3 is a waveform chart taken when a charging circuit in the portable device of FIG. 2 performs current control.
Figure 4:
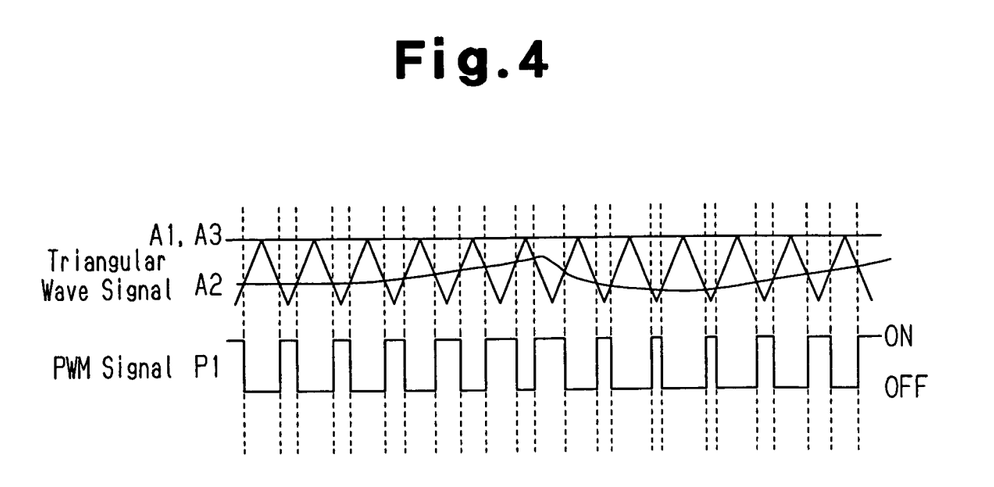
FIG. 4 is a waveform chart taken when the charging circuit performs voltage control.

FIG. 3 is a waveform chart taken when the charging circuit 15 performs current control. FIG. 4 is a waveform chart taken when the charging circuit 15 performs voltage control.

Referring to FIG. 3, during current control, the battery voltage is low and the difference between the divisional voltage, which is produced by the resistors R1 and R2, and the second reference voltage e2 is large. Thus, the second charge control signal A2 has a voltage that is greater than the maximum voltage of the triangular signal. The voltage of the first charge control signal A1 is lower than the maximum voltage of the triangular wave signal (i.e., third reference voltage e3). Thus, the voltage comparator 27 generates the third charge control signal A3 at a high level. The voltage of the third charge control signal A3 is greater than or equal to the maximum voltage of the triangular signal in the same manner as the second charge control signal A2.

During current control, when the charging current Ic that flows through the sense resistor Rs decreases, the voltage drop produced by the sense resistor Rs decreases. This decreases the voltage of the current detection signal A0. When the voltage of the current detection signal A0 decreases, the voltage difference between the current detection signal A0 and the first reference voltage e1 increases. This increases the output voltage of the first error amplifier 25 (i.e., voltage of the first charge control signal A1).

When the charging current Ic that flows through the sense resistor Rs increases, the voltage drop produced by the sense resistor Rs increases. This increases the voltage of the current detection signal A0. When the voltage of the current detection signal A0 increases, the voltage difference between the current detection signal A0 and the first reference voltage e1 decreases. This decreases the first charge control signal A1.

The PWM comparator 29 compares the first charge control signal A1 and the triangular signal and generates the PWM signal P1 at a high level when the triangular wave signal is lower than the first charge control signal A1. The PWM comparator 29 generates the PWM signal P1 at a low level when the triangular wave signal is higher than the first charge control signal A1. Accordingly, the period during which the PWM signal P1 is high (pulse width) is lengthened when the voltage of the first charge control signal A1 increases. The pulse width of the PWM signal P1 is shortened when the voltage of the first charge control signal A1 is shortened.

Since the PWM signal P1 is inverted by the buffer 30, as the pulse width of the PWM signal P1 increases, the period during which the main switch 21 is ON becomes longer. This amplifies the charging current Ic. On the other hand, as the pulse width of the PWM signal P1 decreases, the period during which the main switch 21 is ON becomes shorter. This decreases the charging current Ic.

In the charging circuit 15, the first reference voltage e1, which is supplied to the second non-inverting input terminal of the first error amplifier 25, sets a predetermined charging current value Ist. When the charging current Ic becomes less than the predetermined charging current Ist, the voltage of the first charge control signal A1 decreases and shortens the pulse width of the PWM signal P1. As a result, the charging current Ic becomes equal to the set charging current value Ist.

In this manner, during current control, the PWM signal P1 controls the main switch 21 and charges the secondary battery 14 with constant current so that the charging current Ic becomes equal to the set charging current value Ist, which is in accordance with the first reference voltage e1.

The operation of the charging circuit 15 during voltage control will now be discussed.

During voltage control, the charging current Ic that flows through the sense resistor Rs is small and the voltage drop caused by the sense resistor Rs is small. Thus, as shown in FIG. 4, the first charge control signal A1 has a voltage that is greater than or equal to the maximum voltage of the triangular wave signal. The voltage of the second charge control signal A1 is less than the maximum voltage of the triangular wave signal (i.e., third reference voltage e3). Thus, the voltage comparator 27 generates the third charge control signal A3 at a high level.

When the battery voltage, which changes in accordance with the charging voltage, decreases during voltage control, the difference between the divisional voltage, which is produced by the voltage dividing circuits R1 and R2, and the second reference voltage e2 increases. Thus, the voltage of the second charge control signal A2 increases. On the other hand, when the battery voltage increases, the difference between the divisional voltage, which is produced by the voltage dividing circuits R1 and R2, and the second reference voltage e2 decreases. Thus, the voltage of the second charge control signal A2 decreases.

The PWM comparator 29 compares the second charge control signal A2 and the triangular signal and generates the PWM signal P1 at a high level when the triangular wave signal is lower than the first charge control signal A1. The PWM comparator 29 generates the PWM signal P1 at a low level when the triangular wave signal is higher than the first charge control signal A1. Accordingly, the pulse width of the PWM signal P1 increases when the voltage of the second charge control signal A1 increases. This lengthens the period during which the main switch 21 is turned ON and increases the charging voltage. When the voltage of the second charge control signal A2 decreases, the pulse width of the PWM signal P1 decreases. This shortens the period during which the main switch 21 is turned ON and decreases the charging voltage.

In the charging circuit 15, the second reference voltage e2, which is supplied to the non-inverting input terminal of the second error amplifier 25, sets a predetermined charging voltage value Vset. When the charging voltage becomes less than the predetermined charging voltage Vset, the voltage of the second charge control signal A2 increases. This increases the pulse width of the PWM signal P1. As a result, the charging voltage increases. As the charging voltage approaches the set charging voltage value Vset, the voltage of the second charge control signal A2 decreases. This decreases the pulse width of the PWM signal P1 and the charging voltage becomes equal to the set charging voltage value Vset.

In this manner, during voltage control, the PWM signal P1 controls the main switch 21 and charges the secondary battery 14 with constant voltage so that the charging current Ic becomes equal to the set charge voltage value Vset, which is in accordance with the second reference voltage e2.

In the preferred embodiment, the battery pack 12 is detachable relative to the portable device 11. When the battery pack 12 is correctly connected to the charging circuit 15 of the portable device 11, current control or voltage control is performed to charge the secondary battery 14.

An example in which contact failure occurs between the terminals t1 to t3 of the battery pack 12 and the respective terminals t11 to t13 of the charging circuit 15 will now be described.

When a contact failure occurs between the voltage detection terminal t3 of the battery pack 12 and the voltage detection terminal t13 of the charging circuit 15, the voltage at the voltage detection terminal t13 decreases to the ground level (0 V), and the ground voltage (0 V) is supplied to the non-inverting input terminal of the first error amplifier 25. In the first error amplifier 25, the ground voltage is compared with the current detection signal A0, and the first charge control signal A1 is generated in accordance with the difference. The non-inverting input terminal of the first error amplifier 25 is a terminal for setting the charging current Ic. When the non-inverting input terminal of the first error amplifier 25 is supplied with 0 V, the charging current Ic is set at 0 A. That is, when the voltage at the voltage detection terminal t13 decreases to the ground level (0 V), the first error amplifier 25 generates the first charge control signal A1 at a low level. The PWM comparator 29 compares the low first charge control signal A1 with the triangular wave signal and generates the PWM signal P1 having a pulse width that is just short enough to keep the main switch 21 OFF. This causes the charging current Ic to be 0 A in the charging circuit 15. Thus, when a contact failure occurs between the voltage detection terminals t3 and t13, the charging circuit 15 stops the charging operation.

When a contact failure occurs between the positive terminal t1 of the battery pack 12 and the positive terminal t11 of the charging circuit 15, the charging current flowing through the sense resistor Rs is 0 A, and the difference between the current detection signal A0 of the voltage amplifier 24 and the first reference voltage e1 increases. Thus, the first error amplifier 25 generates the first charge control signal A1 at a level that is higher than the maximum voltage of the triangular wave signal. In this state, charging is not performed and the battery voltage remains low. Thus, the difference between the divisional voltage, which is produced by the voltage dividing resistors R1 and R2, and the second reference voltage e2 increases. As a result, the second error amplifier 26 generates the second discharge control signal A2, which has a level that is higher than the maximum voltage of the triangular wave signal.

In this case, the charge control signals A1 and A2 are both greater than the third reference voltage e3 (maximum voltage of the triangular wave signal). Thus, the voltage comparator 27 generates the third charge control signal A3 at a low level. The PWM comparator 29 compares the third charge control signal A3 and the triangular wave signal to generate the PWM signal P1 having the pulse width that is just short enough to keep the main switch 21 OFF. This stops the charging operation with the charging circuit 15.

Further, when a contact failure occurs between the negative terminal t2 of the battery pack 12 and the negative terminal t12 of the charging circuit 15, the inverting input terminal of the second error amplifier 26 is supplied with a voltage having a voltage value corresponding to the output voltage (charging voltage). In this state, the charging current Ic flowing through the sense resistor Rs is 0 A. Thus, the first error amplifier 25 generates the first charge control signal A1 at a level that is greater than the maximum voltage of the sense resistor Rs. The second error amplifier 26 generates the second charge control signal A2 so that the charging voltage becomes equal to the set charging voltage value Vset, which is in accordance with the second reference voltage e2. The PWM comparator 29 generates the PWM signal P1 from the second charge control signal A2 and the triangular wave signal. Accordingly, when a contact failure occurs between the negative terminals t2 and t12, the charging circuit 15 generates constant voltage in a state in which there is no load and maintains this state.

(1) When a contact failure occurs between the voltage detection terminal t3 of the battery pack 12 and the voltage detection terminal t13 of the charging circuit 15 and causes voltage abnormality (0 V) at the voltage detection terminal t13, the first error amplifier 25 generates the first charge control signal A1 at a low level. In this state, the PWM signal P1 of the PWM comparator 29 has a pulse width that is just short enough to keep the main switch 21 OFF, and the charge current Ic becomes 0 A. That is, since the charging operation with the charging circuit 15 is stopped, overdischarging caused by the contact failure between the voltage detection terminals t3 and t13 is prevented.

(2) When the terminals t1 to t3 are normally connected to the respective terminals t11 to t13, charging is performed through the current control of FIG. 3 or the voltage control of FIG. 4. In this case, the first charge control signal A1 of the first error amplifier 25 or the second charge control signal A2 of the second error amplifier 26 has a voltage that is lower than the maximum voltage of the triangular wave signal.

When a contact failure occurs between the positive terminal t1 of the battery pack 12 and the positive terminal t11 of the charging circuit 15, the charge control signals A1 and A2 each have a voltage that is greater than the triangular wave signal. In this state, the voltage comparator 27 provides the PWM comparator 29 with the third charge control signal A3 at a low level and stops the charging operation with the charging circuit 15.

(3) The charging circuit 15, which includes the amplifiers 24 to 27, the triangular wave oscillator 28, and the PWM comparator 29, is configured in the charge IC 22, which is formed on a semiconductor substrate chip. This enables the size of the portable device 11 to be reduced.

It should be apparent to those skilled in the art that the present invention may be embodied in many other specific forms without departing from the spirit or scope of the invention. Particularly, it should be understood that the present invention may be embodied in the following forms.

The voltage comparator 27 may be eliminated from the charge IC 22. In this case, charging is also stopped when a contact failure occurs between voltage detection terminals t3 and t13. This prevents overcharging of the secondary battery 14.

A circuit for detecting voltage abnormality at the voltage detection terminals t3 and t13 may be provided separately from the first error amplifier 25. In this case, when the detection circuit detects a voltage abnormality, the PWM signal P1 of the PWM comparator 29 has a pulse width that is just short enough to keep the main switch 21 OFF.

There is no restriction to the number or connection (series connection or parallel connection) of the battery cells incorporated in the secondary battery 14.

The portable device 11 may be a cellular phone or a personal digital assistance (PDA).

The present examples and embodiments are to be considered as illustrative and not restrictive, and the invention is not to be limited to the details given herein, but may be modified within the scope and equivalence of the appended claims.

What is claimed is:

1. A portable device connectable to a battery pack including a secondary battery, the portable device comprising:
   a charging circuit for charging the secondary battery when the battery pack is connected with the portable device, the charging circuit including a charging terminal used to supply the secondary battery with charging current, and a voltage detection terminal used to detect voltage of the secondary battery in the battery pack, the charging circuit stopping charging of the secondary battery when a voltage decreases to zero volt at the voltage detection terminal.

2. The portable device according to claim 1, wherein the charging circuit stops charging the secondary battery when a voltage decreases to zero volt at the charging terminal.

3. The portable device according to claim 1, wherein the charging circuit includes:
   a current detection resistor for detecting the charging current;
   a current detection circuit connected to the current detection resistor to generate a current detection signal corresponding to the charging current flowing through the current detection resistor;
   a first error amplifier connected to the current detection circuit, wherein the first error amplifier compares the current detection signal with a first reference voltage to obtain the difference therebetween and amplifies the difference to generate a first charge control signal with a voltage that causes charging to be performed at a constant current when the voltage at the voltage detection terminal is normal; and
   a second error amplifier connected to the voltage detection terminal, wherein the second error amplifier compares voltage derived from the voltage of the secondary battery with a second reference voltage and amplifies the difference to generate a second charge control signal that causes charging to be performed at a constant voltage; and
   wherein the first error amplifier is supplied with the voltage of the voltage detection terminal and generates the first charge control signal with a voltage that causes charging to be stopped when the voltage at the voltage detection terminal decreases to zero volt.

4. The portable device according to claim 3, wherein the charging circuit further includes:
   a charging suspension circuit connected to the first and second error amplifiers to generate a third charge control signal that causes charging to be stopped when the first and second charge control signals indicate that the voltage at the voltage detection terminal decreases to zero volt.

5. The portable device according to claim 4, wherein:
   the first error amplifier includes an inverting input terminal provided with the current detection signal, a first non-inverting input terminal supplied with the voltage of the voltage detection terminal, and a second non-inverting input terminal supplied with the first reference voltage;
   the second error amplifier includes an inverting input terminal supplied with a divisional voltage of the voltage of the secondary battery and a non-inverting input terminal supplied with the second reference voltage; and
   the charging circuit includes an inverting input terminal supplied with a third reference voltage, a first non-inverting input terminal provided with the first charge control signal, and a second non-inverting input terminal provided with the second charge control signal.

6. The portable device according to claim 5, wherein the charging circuit further includes:
   a triangular wave oscillator for generating a triangular wave signal; and
   a PWM comparator connected to the triangular wave oscillator, the first and second error amplifiers, and the charging suspension circuit, wherein the PWM comparator is provided with the first to third charge control signals and the triangular wave signal to generate a PWM signal having a predetermined duty ratio in accordance with the result of a comparison between one of the first to third charge control signals and the triangular wave signal.

7. The portable device according to claim 6, wherein:
   the first reference voltage is a voltage for setting a constant current value related with the constant current charging;
   the second reference voltage is a voltage for setting a constant voltage value related with the constant voltage charging; and
   the third reference voltage is substantially the same as the maximum voltage of the triangular wave signal.

8. The portable device according to claim 1, wherein the charge circuit is a remote sense type circuit for directly detecting voltage at a positive terminal of the secondary battery in the battery pack and charging the secondary battery.

9. A semiconductor device for use in a charging circuit of a portable device connectable to a battery pack including a secondary battery, wherein the charging circuit charges the secondary battery when connected to the portable device supplies the secondary battery with charging current, and includes a voltage detection terminal used to detect voltage of the secondary battery in the battery pack and a current detection resistor for detecting the charging current, the semiconductor device comprising:
- a current detection circuit connected to the current detection resistor to generate a current detection signal corresponding to the charging current flowing through the current detection resistor;
- a first error amplifier connected to the current detection circuit, wherein the first error amplifier compares the current detection signal with a first reference voltage to obtain the difference therebetween and amplifies the difference to generate a first charge control signal with a voltage that causes charging to be performed at a constant current when the voltage at the voltage detection terminal is normal; and
- a second error amplifier connected to the voltage detection terminal, wherein the second error amplifier compares voltage derived from the voltage of the secondary battery with a second reference voltage and amplifies the difference to generate a second charge control signal that causes charging to be performed at a constant voltage;
- wherein the first error amplifier is supplied with the voltage of the voltage detection terminal and generates the first charge control signal with a voltage that causes charging to be stopped when the voltage at the voltage detection terminal decreases to zero volt.

10. The semiconductor device according to claim 9, wherein the current detection circuit, the first error amplifier, and the second error amplifier are configured on a single semiconductor substrate chip.

11. The semiconductor device according to claim 9, further comprising:
- a charging suspension circuit connected to the first and second error amplifiers to generate a third charge control signal that causes charging to be stopped when the first and second charge control signals indicate that the voltage at the voltage detection terminal decreases to zero volt.

12. The semiconductor device according to claim 11, wherein:
- the first error amplifier includes an inverting input terminal provided with the current detection signal, a first non-inverting input terminal supplied with the voltage of the voltage detection terminal, and a second non-inverting input terminal supplied with the first reference voltage;
- the second error amplifier includes an inverting input terminal supplied with a divisional voltage of the voltage of the secondary battery and a non-inverting input terminal supplied with the second reference voltage; and
- the charging circuit includes an inverting input terminal supplied with a third reference voltage, a first non-inverting input terminal provided with the first charge control signal, and a second non-inverting input terminal provided with the second charge control signal.

13. The semiconductor device according to claim 12, further comprising:
- a triangular wave oscillator for generating a triangular wave signal; and
- a PWM comparator connected to the triangular wave oscillator, the first and second error amplifiers, and the charging suspension circuit, wherein the PWM comparator is provided with the first to third charge control signals and the triangular wave signal to generate a PWM signal having a predetermined duty ratio in accordance with the result of a comparison between one of the first to third charge control signals and the triangular wave signal.

14. The semiconductor device according to claim 13, wherein:
- the first reference voltage is a voltage for setting a constant current value related with the constant current charging;
- the second reference voltage is a voltage for setting a constant voltage value related with the constant voltage charging; and
- the third reference voltage is substantially the same as the maximum voltage of the triangular wave signal.

15. The semiconductor device according to claim 14, wherein the current detection circuit, the first error amplifier, the second error amplifier, the charging suspension circuit, the triangular wave oscillator, and the PWM comparator are configured on a single semiconductor substrate chip.

16. A method for charging a secondary battery of a battery pack with a portable device that is connectable to the battery pack, wherein the battery pack includes a first voltage detection terminal used to detect voltage of the secondary battery in the battery pack, and the portable device includes a second voltage detection terminal connected to the first voltage detection terminal, the method comprising:
- connecting the battery pack to the portable device and supplying charging current to the battery pack from the portable device;
- detecting the charging current and generating a current detection signal that is in accordance with the charging current;
- comparing voltage of the current detection signal with voltage at the second voltage detection terminal; and
- stopping the supply of charging current to the battery pack from the portable device in accordance with the result of the comparison when the voltage at the second voltage detection terminal decreases to zero volt.

* * * * *